US011919312B2

(12) United States Patent
Oka et al.

(10) Patent No.: US 11,919,312 B2
(45) Date of Patent: Mar. 5, 2024

(54) PRINTING APPARATUS

(71) Applicant: FUNAI ELECTRIC CO., LTD., Osaka (JP)

(72) Inventors: Junpei Oka, Osaka (JP); Kohsuke Hori, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 107 days.

(21) Appl. No.: 17/695,807

(22) Filed: Mar. 15, 2022

(65) Prior Publication Data

US 2022/0332120 A1 Oct. 20, 2022

(30) Foreign Application Priority Data

Apr. 14, 2021 (JP) ................................ 2021-068528

(51) Int. Cl.
*B41J 2/175* (2006.01)
*B41J 29/13* (2006.01)

(52) U.S. Cl.
CPC .......... *B41J 2/175* (2013.01); *B41J 2/17509* (2013.01); *B41J 2/1752* (2013.01); *B41J 2/17523* (2013.01); *B41J 29/13* (2013.01)

(58) Field of Classification Search
CPC . B41J 2/01; B41J 2/175; B41J 2/17503; B41J 2/17506; B41J 2/17509; B41J 2/1752; B41J 2/17523; B41J 29/13
See application file for complete search history.

(56) References Cited

U.S. PATENT DOCUMENTS

| | | | | |
|---|---|---|---|---|
| 8,430,487 | B2 * | 4/2013 | Sekino | B41J 2/175 347/86 |
| 10,286,695 | B2 * | 5/2019 | Moriyama | B41J 2/17523 |
| 2009/0167825 | A1 | 7/2009 | Kawamura et al. | |
| 2014/0043409 | A1 * | 2/2014 | Suzuki | B41J 2/17509 347/86 |

FOREIGN PATENT DOCUMENTS

| | | |
|---|---|---|
| JP | 2001130020 | 5/2001 |
| JP | 2006015706 | 1/2006 |

* cited by examiner

*Primary Examiner* — Anh T Vo
(74) *Attorney, Agent, or Firm* — JCIPRNET

(57) ABSTRACT

A printing apparatus includes a carriage, ink tanks, ink tubes, and a first tube holder. The carriage reciprocates in a predetermined direction with respect to a recording medium and has recording heads ejecting ink to the recording medium. The ink tanks are arranged outside the carriage and are configured to contain ink. The ink tubes connect the ink tanks and the recording heads to each other to supply the ink contained in the ink tanks to the recording heads, and the ink tubes undergo follow-up deformation along with reciprocating movement of the carriage. The first tube holder is rotatably supported with respect to the carriage and holds the ink tubes.

2 Claims, 7 Drawing Sheets

PRINTING APPARATUS

CROSS-REFERENCE TO RELATED APPLICATION

This application claims the priority benefit of Japan application serial no. 2021-068528, filed on Apr. 14, 2021. The entirety of the above-mentioned patent application is hereby incorporated by reference herein and made a part of this specification.

BACKGROUND

Technical Field

The disclosure relates to a printing apparatus for printing on a recording medium.

Related Art

An ink supply type printing apparatus is conventionally known (see, for example, Patent Document 1: Japanese Patent Application Laid-Open No. 2001-130020). This type of printing apparatus includes a carriage which reciprocates in a predetermined direction and has a recording head, an ink tank which is arranged outside the carriage, and an ink tube which connects the recording head and the ink tank to each other.

The carriage is provided with a fixing part for fixing the ink tube to the carriage. The ink contained in the ink tank is supplied to the recording head via the ink tube.

In the conventional printing apparatus described above, the ink tube undergoes follow-up deformation as the carriage reciprocates. At this time, the posture of the ink tube with respect to the fixing part of the carriage changes as the carriage reciprocates. Therefore, a load is applied to a portion of the ink tube fixed to the fixing part of the carriage, and the ink tube may be damaged due to accumulation of the load.

SUMMARY

A printing apparatus according to an aspect of the disclosure is a printing apparatus for printing on a recording medium and includes a carriage, an ink tank, an ink tube, and a first tube holder. The carriage reciprocates in a predetermined direction with respect to the recording medium and includes a recording head ejecting ink to the recording medium. The ink tank is arranged outside the carriage and is configured to contain ink. The ink tube connects the ink tank and the recording head to each other to supply the ink contained in the ink tank to the recording head, and the ink tube undergoes follow-up deformation along with reciprocating movement of the carriage. The first tube holder is rotatably supported with respect to the carriage and holds the ink tube.

According to this aspect, the first tube holder is rotatably supported with respect to the carriage and holds the ink tube. Accordingly, the first tube holder rotates with respect to the carriage in response to the follow-up deformation of the ink tube along with the reciprocating movement of the carriage. As a result, it is possible to suppress a forced posture taken by the ink tube with respect to the carriage, and it is possible to reduce the load applied to the ink tube.

For example, in the printing apparatus according to an aspect of the disclosure, the first tube holder may be rotatable with respect to the carriage on a rotation axis parallel to an ejection direction of the ink from the recording head.

According to this aspect, the load applied to the ink tube can be effectively reduced.

For example, in the printing apparatus according to an aspect of the disclosure, the printing apparatus may further include a second tube holder which is supported to be displaceable with respect to the first tube holder and holds the ink tube.

According to this aspect, with the second tube holder, it is possible to absorb the movement of the ink tube with respect to the first tube holder. As a result, the load applied to the ink tube can be reduced more effectively.

For example, in the printing apparatus according to an aspect of the disclosure, the second tube holder may be displaceable with respect to the first tube holder in three axis directions orthogonal to each other.

According to this aspect, with the second tube holder, it is possible to absorb the movement of the ink tube with respect to the first tube holder in the three axis directions orthogonal to each other.

For example, in the printing apparatus according to an aspect of the disclosure, the three axis directions may include a first direction parallel to the rotation axis, a second direction parallel to a long direction of the ink tube in the second tube holder, and a third direction parallel to a radial direction of the ink tube in the second tube holder.

According to this aspect, with the second tube holder being displaced in the first direction with respect to the first tube holder, it is possible to absorb the movement of the ink tube with respect to the first tube holder in the first direction resulting from twisting of the ink tube. Further, with the second tube holder being displaced in the second direction with respect to the first tube holder, it is possible to absorb the movement of the ink tube with respect to the first tube holder in the second direction. Further, with the second tube holder being displaced in the third direction with respect to the first tube holder, it is possible to expand a movable range of the movement of the ink tube with respect to the first tube holder in the third direction.

According to the printing apparatus according to an aspect of the disclosure, the load applied to the ink tube can be reduced.

DESCRIPTION OF THE EMBODIMENTS

Embodiments of the disclosure provide a printing apparatus capable of reducing a load applied to an ink tube.

Hereinafter, embodiments of the disclosure will be described in detail with reference to the drawings. The embodiments described below all show comprehensive or specific examples. Numerical values, shapes, materials, components, arrangement positions of components, connection forms, and the like shown in the following embodiments are exemplary and are not intended to limit the disclosure. Further, among the components in the following embodiments, the components not described in the independent claims will be described as arbitrary components.

Embodiment

[1. Configuration of Printing Apparatus]

Figure 1:
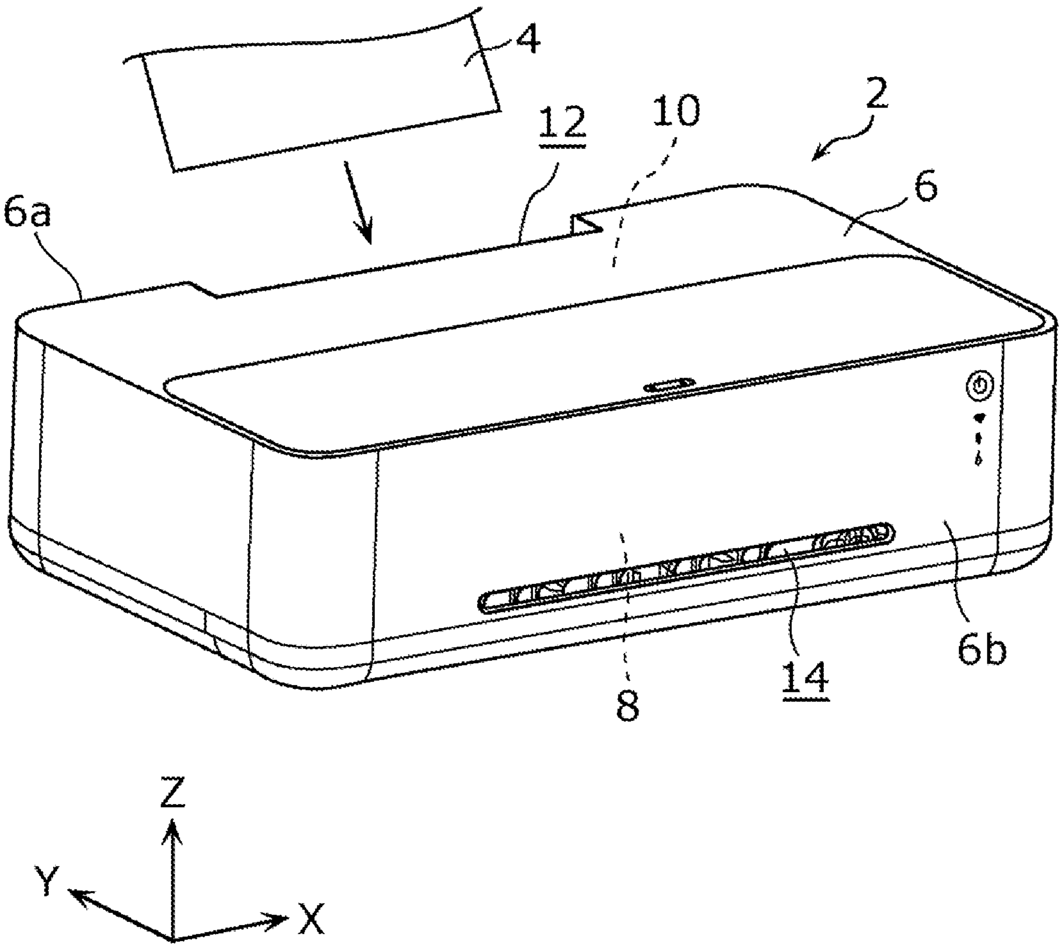
FIG. 1 is a perspective view showing an appearance of a printing apparatus according to an embodiment.
Figure 2:
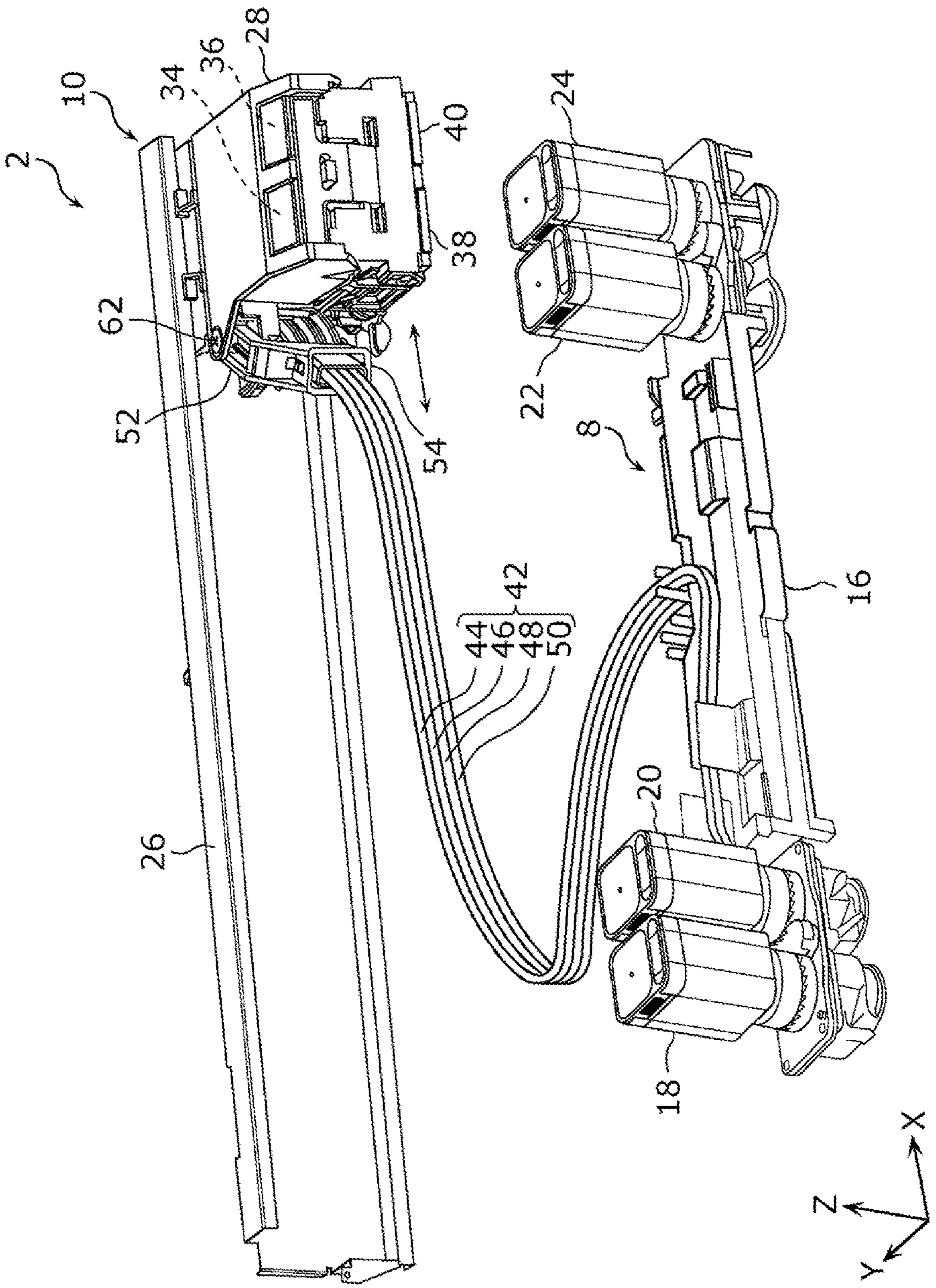
FIG. 2 is a perspective view showing an extracted part of an internal mechanism of the printing apparatus according to the embodiment.
Figure 3:
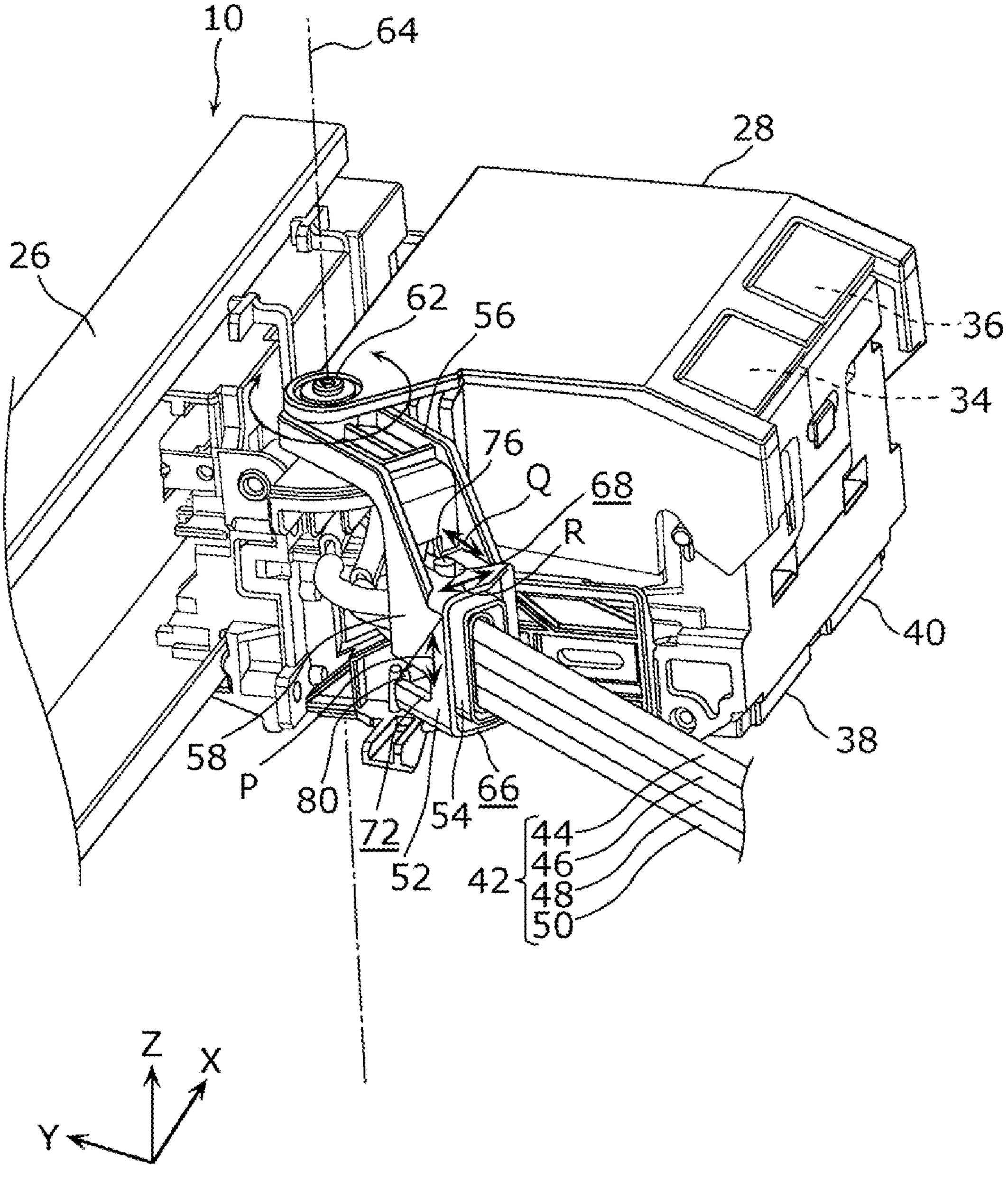
FIG. 3 is an enlarged perspective view showing a first tube holder and a second tube holder according to the embodiment.
Figure 4:
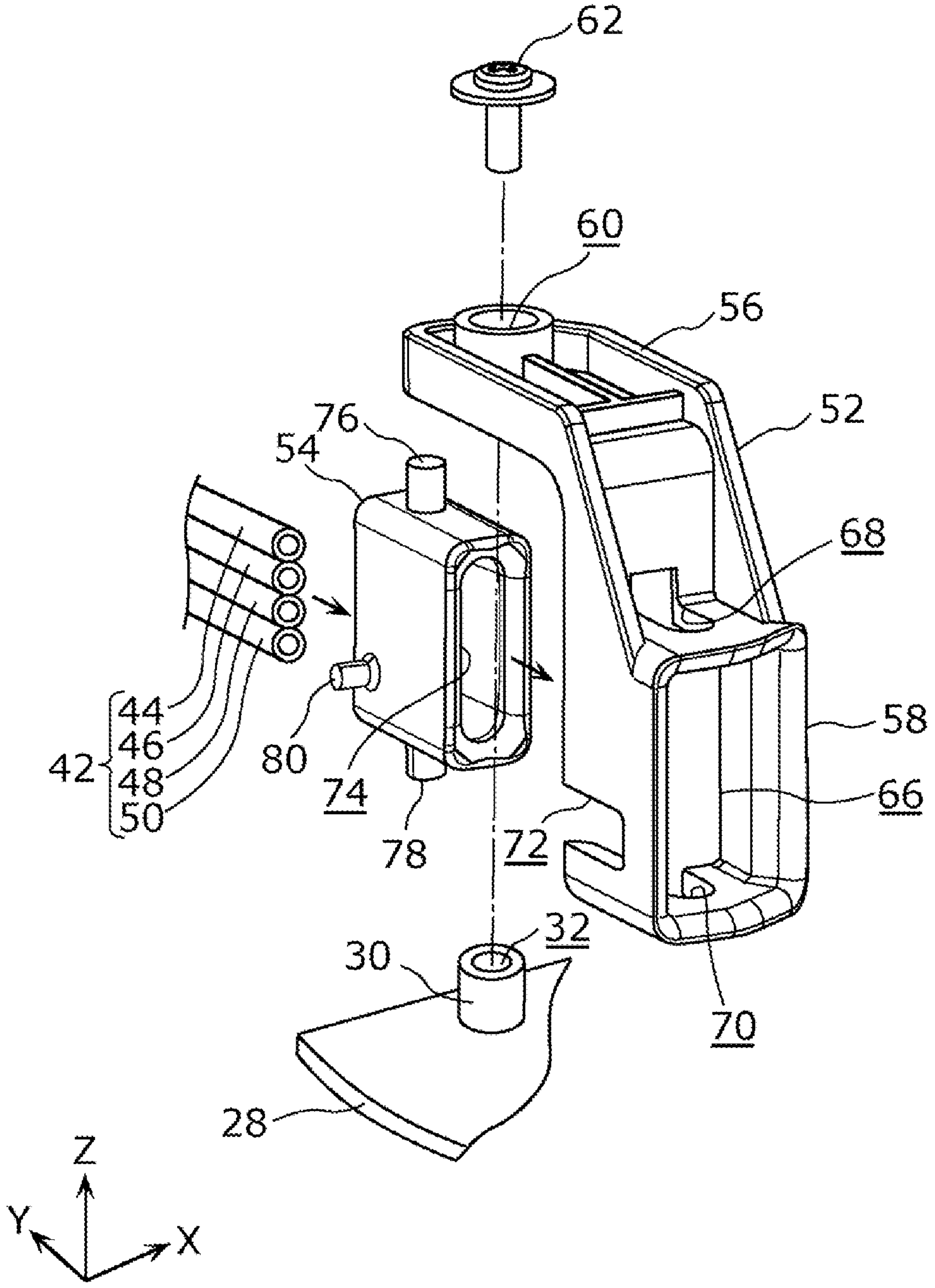
FIG. 4 is an exploded perspective view showing the first tube holder and the second tube holder according to the embodiment in an exploded manner.
Figure 5:
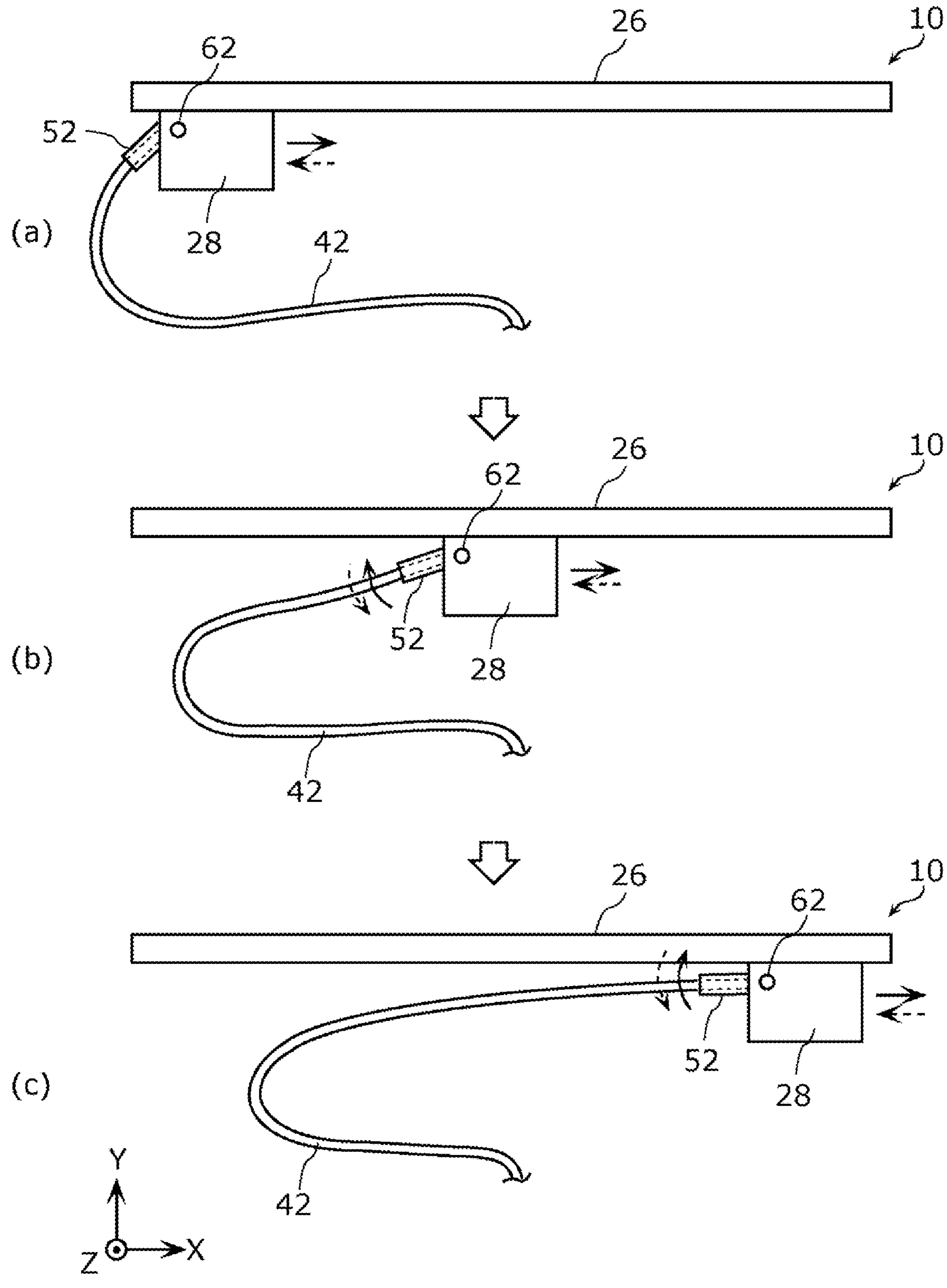
FIG. 5 is a schematic view showing how an ink tube unit undergoes follow-up deformation along with reciprocating movement of a carriage in a printing unit according to the embodiment.

First, a configuration of a printing apparatus 2 according to an embodiment will be described with reference to FIG. 1 to FIG. 5. FIG. 1 is a perspective view showing an appearance of the printing apparatus 2 according to the embodiment. FIG. 2 is a perspective view showing an extracted part of an internal mechanism of the printing apparatus 2 according to the embodiment. FIG. 3 is an enlarged perspective view showing a first tube holder 52 and a second tube holder 54 according to the embodiment. FIG. 4 is an exploded perspective view showing the first tube holder 52 and the second tube holder 54 according to the embodiment in an exploded manner. FIG. 5 is a schematic view showing how an ink tube unit 42 undergoes follow-up deformation along with reciprocating movement of a carriage 28 in a printing unit 10 according to the embodiment.

In FIG. 1 to FIG. 4, a width direction (left-right direction) of the printing apparatus 2 is the X-axis direction, a depth direction (front-rear direction) of the printing apparatus 2 is the Y-axis direction, and a height direction (up-down direction) of the printing apparatus 2 is the Z-axis direction.

As shown in FIG. 1, the printing apparatus 2 is an inkjet printer which prints by ejecting ink to a recording medium 4. The recording medium 4 is, for example, plain paper, photo paper, a CD-ROM (compact disc read only memory) having a printable label surface, etc. As shown in FIG. 1 and FIG. 2, the printing apparatus 2 includes a housing 6, a tank unit 8, and a printing unit 10.

As shown in FIG. 1, a supply port 12 for supplying a recording medium 4 to be printed to the inside of the housing 6 is provided at an upper end of a back surface 6*a* of the housing 6. The recording medium 4 is inserted into the supply port 12 from above. Although not shown, a supply tray for supporting, from the rear side, the recording medium 4 inserted into the supply port 12 is fixed to the upper end of the back surface 6*a* of the housing 6. A discharge port 14 for discharging the printed recording medium 4 to the outside of the housing 6 is provided at a front surface 6*b* of the housing 6.

The recording medium 4 inserted into the supply port 12 is transported inside the housing 6 in a direction (minus direction of the Y-axis) from the supply port 12 toward the discharge port 14 by a transport mechanism (not shown) arranged inside the housing 6.

The tank unit 8 is arranged inside the housing 6. As shown in FIG. 2, the tank unit 8 includes a frame 16, a cyan (C) ink tank 18 (an example of an ink tank), a magenta (M) ink tank 20 (an example of the ink tank), a yellow (Y) ink tank 22 (an example of the ink tank), and a black (K) ink tank 24 (an example of the ink tank). The cyan ink tank 18, the magenta ink tank 20, the yellow ink tank 22, and the black ink tank 24 are supported by the frame 16 and are arranged outside a carriage 28.

The cyan ink tank 18 contains cyan ink. The magenta ink tank 20 contains magenta ink. The yellow ink tank 22 contains yellow ink. The black ink tank 24 contains black ink.

The printing unit 10 is arranged inside the housing 6. As shown in FIG. 2, the printing unit 10 includes a guide frame 26 and a carriage 28 supported by the guide frame 26. The guide frame 26 extends in the width direction (X-axis direction) of the printing apparatus 2. The carriage 28 may reciprocate along the guide frame 26 in a predetermined direction (X-axis direction), i.e., in a direction substantially perpendicular to a transport direction of the recording medium 4. As shown in FIG. 4, a shaft part 30 in a columnar shape projecting upward (plus direction of the Z-axis) is formed on an upper surface of the carriage 28. A screw hole 32 is formed in the shaft part 30.

A color ink container 34 and a black ink container 36 are mounted on the carriage 28. The color ink container 34 is a container for temporarily storing the cyan ink, the magenta ink, and the yellow ink respectively supplied from the cyan ink tank 18, the magenta ink tank 20, and the yellow ink tank 22. A recording head 38 for ejecting the cyan ink, the magenta ink, and the yellow ink stored in the color ink container 34 downward (minus direction of the Z-axis) is arranged at a lower end of the color ink container 34. The black ink container 36 is a container for temporarily storing the black ink supplied from the black ink tank 24. A recording head 40 for ejecting the black ink stored in the black ink container 36 downward is arranged at a lower end of the black ink container 36.

At the time of printing, the recording medium 4 is transported inside the housing 6 from the supply port 12 toward the discharge port 14, and the carriage 28 reciprocates along the guide frame 26. In this state, each ink is ejected from the recording heads 38 and 40 to the recording medium 4 to print on the recording medium 4.

As shown in FIG. 2, the printing apparatus 2 further includes an ink tube unit 42. The ink tube unit 42 includes a cyan ink tube 44 (an example of an ink tube), a magenta ink tube 46 (an example of the ink tube), a yellow ink tube 48 (an example of the ink tube), and a black ink tube 50 (an example of the ink tube). The cyan ink tube 44, the magenta ink tube 46, the yellow ink tube 48, and the black ink tube 50 are sequentially bundled in a band shape and undergo follow-up deformation along with the reciprocating movement of the carriage 28.

The cyan ink tube 44 is a flexible tube for connecting the cyan ink tank 18 and the recording head 38 mounted on the carriage 28 to each other. The cyan ink tube 44 supplies the cyan ink contained in the cyan ink tank 18 to the recording head 38 via the color ink container 34.

The magenta ink tube 46 is a flexible tube for connecting the magenta ink tank 20 and the recording head 38 mounted on the carriage 28 to each other. The magenta ink tube 46 supplies the magenta ink contained in the magenta ink tank 20 to the recording head 38 via the color ink container 34.

The yellow ink tube 48 is a flexible tube for connecting the yellow ink tank 22 and the recording head 38 mounted on the carriage 28 to each other. The yellow ink tube 48 supplies the yellow ink contained in the yellow ink tank 22 to the recording head 38 via the color ink container 34.

The black ink tube 50 is a flexible tube for connecting the black ink tank 24 and the recording head 40 mounted on the carriage 28 to each other. The black ink tube 50 supplies the black ink contained in the black ink tank 24 to the recording head 40 via the black ink container 36.

As shown in FIG. 3 and FIG. 4, the printing unit 10 further includes a first tube holder 52 and a second tube holder 54.

The first tube holder 52 is a holder for holding the ink tube unit 42. With the first tube holder 52 holding the ink tube unit 42, it is possible to suppress hanging of the ink tube unit 42 downward. The first tube holder 52 includes a horizontal part 56 and a vertical part 58.

The horizontal part 56 extends in the horizontal direction (in the XY plane) and has a through hole 60 in a circular shape. The shaft part 30 of the carriage 28 is rotatably inserted into the through hole 60 of the horizontal part 56. By screwing a screw 62 into the screw hole 32 of the shaft part 30 through the through hole 60 of the horizontal part 56, the first tube holder 52 is supported to be rotatable on a rotation axis 64 with respect to the carriage 28. Herein, the rotation axis 64 is an axis which passes through a diameter center of the shaft part 30 and is parallel to an ejection direction (Z-axis direction) of the ink from the recording heads 38 and 40.

The vertical part 58 extends in the vertical direction (Z-axis direction) from one end of the horizontal part 56 and has an opening 66 in a substantially rectangular shape. A first notch 68 is formed at an upper end of the opening 66. Further, a second notch 70 is formed at a lower end of the opening 66. Further, a third notch 72 is formed at a lateral side of the opening 66.

The second tube holder 54 is a holder for holding the ink tube unit 42. The second tube holder 54 is formed in a substantially rectangular tubular shape, and a vertically long insertion space 74 extending in the horizontal direction is formed inside the second tube holder 54. The ink tube unit 42 is inserted into the insertion space 74. The cyan ink tube 44, the magenta ink tube 46, the yellow ink tube 48, and the black ink tube 50 are bundled in a band shape in the up-down direction in the insertion space 74. The ink tube unit 42 is fixed to the second tube holder 54.

A first protrusion 76 in a columnar shape is formed on an upper end surface of the second tube holder 54. A diameter of the first protrusion 76 is smaller than a size of the first notch 68. A second protrusion 78 in a columnar shape is formed at a lower end surface of the second tube holder 54. A diameter of the second protrusion 78 is smaller than a size of the second notch 70. A third protrusion 80 in a columnar shape is formed on a lateral side surface of the second tube holder 54. A diameter of the third protrusion 80 is smaller than a size of the third notch 72.

The second tube holder 54 is inserted into the opening 66 of the vertical part 58 of the first tube holder 52. At this time, the first protrusion 76, the second protrusion 78, and the third protrusion 80 of the second tube holder 54 are respectively inserted into the first notch 68, the second notch 70, and the third notch 72 of the first tube holder 52 in a displaceable manner. Accordingly, the second tube holder 54 is supported to be displaceable in three axis directions orthogonal to each other with respect to the first tube holder 52.

The three axis directions above include a first direction (a direction indicated by an arrow P in FIG. 3) parallel to the rotation axis 64, a second direction (a direction indicated by an arrow Q in FIG. 3) parallel to a long direction of each of the ink tubes 44, 46, 48, and 50 in the second tube holder 54, and a third direction (a direction indicated by an arrow R in FIG. 3) parallel to a radial direction of each of the ink tubes 44, 46, 48, and 50 in the second tube holder 54.

As shown in (a), (b), and (c) of FIG. 5, the ink tube unit 42 undergoes follow-up deformation as the carriage 28 reciprocates in a predetermined direction (X-axis direction). At this time, the first tube holder 52 rotates with respect to the carriage 28 in response to the follow-up deformation of the ink tube unit 42. In other words, in (a), (b), and (c) of FIG. 5, when the carriage 28 moves in a direction indicated by a solid line arrow, the first tube holder 52 rotates in a direction indicated by a solid line arrow with respect to the carriage 28. On the other hand, when the carriage 28 moves in a direction indicated by a broken line arrow, the first tube holder 52 rotates in a direction indicated by a broken line arrow with respect to the carriage 28.

[2. Effect]

Figure 6:
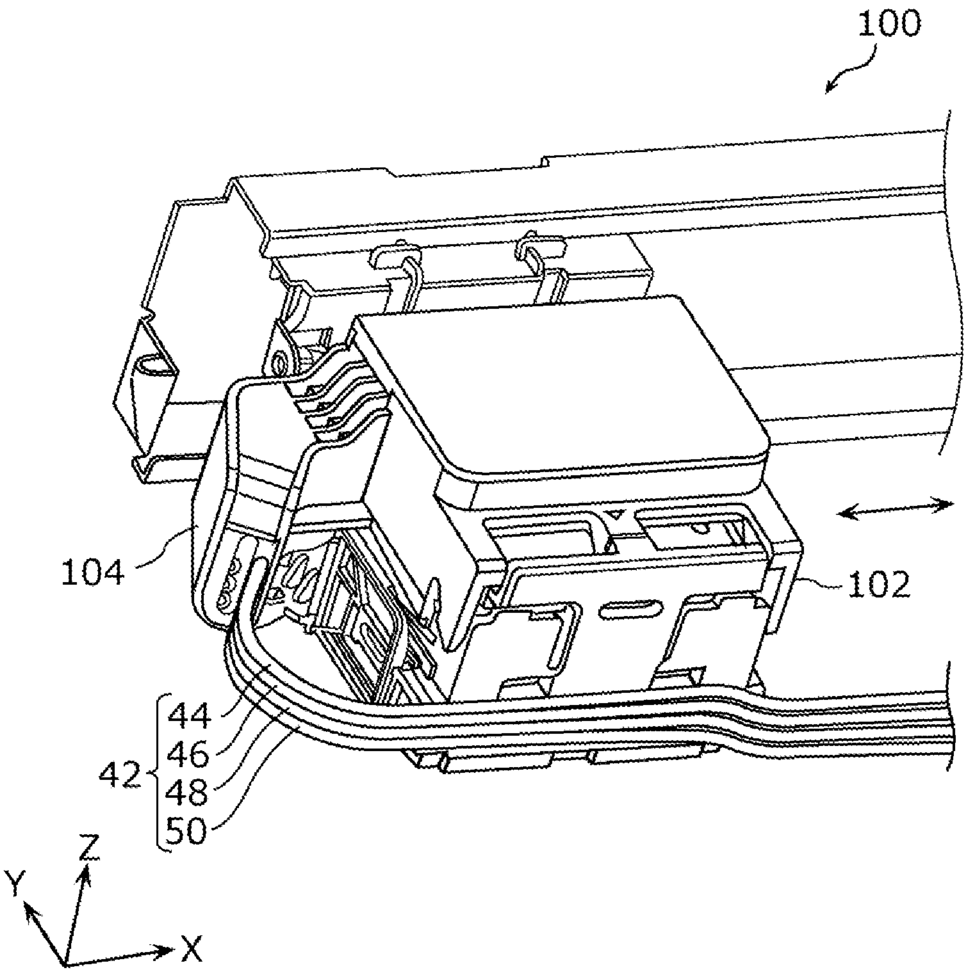
FIG. 6 is a perspective view showing a carriage of a printing unit according to a comparative example.
Figure 7:
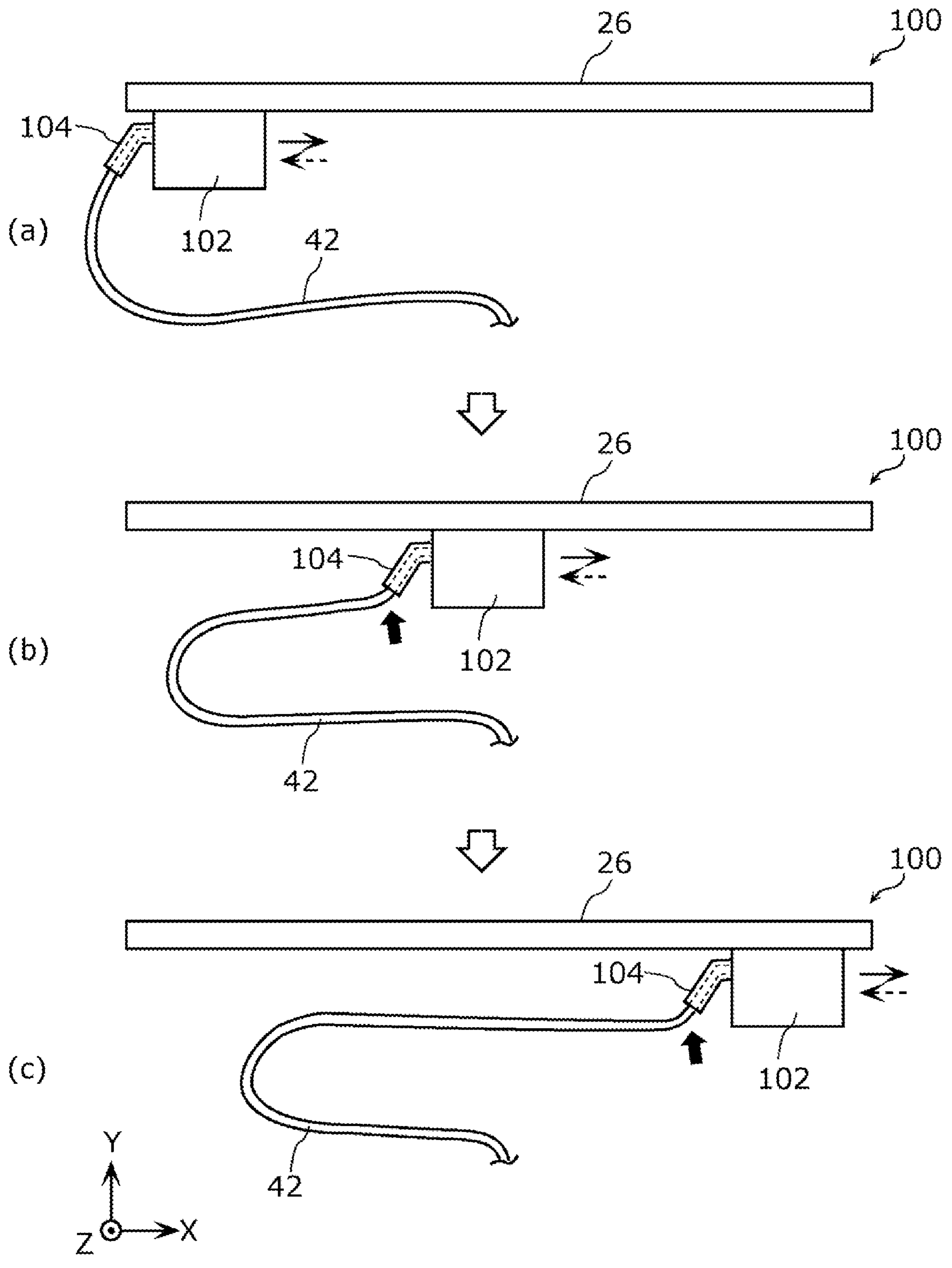
FIG. 7 is a schematic view showing how an ink tube unit undergoes follow-up deformation along with reciprocating movement of the carriage in the printing unit according to the comparative example.

Hereinafter, a configuration of a printing unit 100 according to a comparative example will be described with reference to FIG. 6 and FIG. 7. FIG. 6 is a perspective view showing a carriage 102 of the printing unit 100 according to the comparative example. FIG. 7 is a schematic view showing how an ink tube unit 42 undergoes follow-up deformation along with reciprocating movement of the carriage 102 in the printing unit 100 according to the comparative example. In FIG. 6 and FIG. 7, the same components as those in FIG. 1 to FIG. 5 are labeled with the same reference signs, and descriptions thereof will be omitted.

As shown in FIG. 6, the carriage 102 of the printing unit 100 according to the comparative example is provided with a fixing part 104 for fixing the ink tube unit 42 to the carriage 102. The fixing part 104 is fixed with respect to the carriage 102.

As shown in (a), (b), and (c) of FIG. 7, in the printing unit 100 according to the comparative example, the ink tube unit 42 undergoes follow-up deformation as the carriage 102 reciprocates in a predetermined direction (X-axis direction). At this time, the posture of the ink tube unit 42 with respect to the fixing part 104 of the carriage 102 changes as the carriage 102 reciprocates. Therefore, a load is applied to a portion (a portion indicated by a thick arrow in (b) and (c) of FIG. 7) of the ink tube unit 42 fixed to the fixing part 104 of the carriage 102, and the ink tube unit 42 may be damaged due to accumulation of the load.

On the other hand, in the printing apparatus 2 according to the embodiment, as shown in (a), (b), and (c) of FIG. 5, in response to the follow-up deformation of the ink tube unit 42 along with the reciprocating movement of the carriage 28, the first tube holder 52 rotates with respect to the carriage 28. As a result, it is possible to suppress a forced posture taken by the ink tube unit 42 with respect to the carriage 28, and it is possible to reduce the load applied to the ink tube unit 42.

Further, in response to the follow-up deformation of the ink tube unit 42 along with the reciprocating movement of the carriage 28, the second tube holder 54 is displaced in the three axis directions orthogonal to each other with respect to the first tube holder 52. With the second tube holder 54, it is possible to absorb the movement of the ink tube unit 42 with respect to the first tube holder 52 in the three axis directions orthogonal to each other.

Specifically, with the second tube holder 54 being displaced in the first direction with respect to the first tube holder 52, it is possible to absorb the movement of each of the ink tubes 44, 46, 48, and 50 with respect to the first tube holder 52 in the first direction resulting from twisting of each of the ink tubes 44, 46, 48, and 50. Further, with the second tube holder 54 being displaced in the second direction with respect to the first tube holder 52, it is possible to absorb the movement of each of the ink tubes 44, 46, 48, and 50 with respect to the first tube holder 52 in the second direction. Further, with the second tube holder 54 being displaced in the third direction with respect to the first tube holder 52, it is possible to expand a movable range of the movement (i.e., movement in the rotation direction of the first tube holder 52) of each of the ink tubes 44, 46, 48, and 50 with respect to the first tube holder 52 in the third direction.

MODIFICATION EXAMPLE

Although the printing apparatus according to the embodiment of the disclosure has been described above, the disclosure is not limited to the above-described embodiment.

In the above embodiment, the ink tube unit 42 includes four ink tubes (i.e., the cyan ink tube 44, the magenta ink tube 46, the yellow ink tube 48, and the black ink tube 50), but the disclosure is not limited thereto and may have, for example, one ink tube, two ink tubes, three ink tubes, or five ink tubes or more.

The printing apparatus according to the disclosure may be applied as an inkjet printer which prints by, for example, ejecting ink onto a recording medium.

What is claimed is:

1. A printing apparatus for printing on a recording medium, the printing apparatus comprising:

a carriage which reciprocates in a predetermined direction with respect to the recording medium and comprises a recording head ejecting ink to the recording medium;

an ink tank which is arranged outside the carriage and is configured to contain ink;

an ink tube which connects the ink tank and the recording head to each other to supply the ink contained in the ink tank to the recording head, wherein the ink tube undergoes follow-up deformation along with reciprocating movement of the carriage;

a first tube holder which is rotatably supported with respect to the carriage and holds the ink tube; and a second tube holder which is supported to be displaceable with respect to the first tube holder and holds the ink tube, wherein the first tube holder is rotatable with respect to the carriage on a rotation axis parallel to an ejection direction of the ink from the recording head, and the second tube holder is displaceable with respect to the first tube holder in three axis directions orthogonal to each other.

2. The printing apparatus according to claim 1, wherein the three axis directions comprise:

a first direction parallel to the rotation axis;

a second direction parallel to a long direction of the ink tube in the second tube holder; and a third direction parallel to a radial direction of the ink tube in the second tube holder.

* * * * *